(12) United States Patent
Hoffman et al.

(10) Patent No.: US 10,219,209 B2
(45) Date of Patent: Feb. 26, 2019

(54) CONTENT DELIVERY ACROSS HETEROGENEOUS NETWORKS

(71) Applicant: THE BOEING COMPANY, Huntington Beach, CA (US)

(72) Inventors: Ceilidh Hoffman, Huntington Beach, CA (US); Jae H. Kim, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 15/083,042

(22) Filed: Mar. 28, 2016

(65) Prior Publication Data
US 2017/0280381 A1 Sep. 28, 2017

(51) Int. Cl.
| | |
|---|---|
| *H04W 48/14* | (2009.01) |
| *H04W 48/18* | (2009.01) |
| *H04L 29/06* | (2006.01) |
| *H04L 29/08* | (2006.01) |
| *H04W 8/14* | (2009.01) |
| *H04W 16/32* | (2009.01) |

(Continued)

(52) U.S. Cl.
CPC ......... *H04W 48/18* (2013.01); *H04L 63/0428* (2013.01); *H04L 67/2809* (2013.01); *H04L 67/327* (2013.01); *H04W 8/14* (2013.01); *H04W 16/32* (2013.01); *H04W 60/00* (2013.01); *H04L 61/106* (2013.01); *H04W 88/16* (2013.01)

(58) Field of Classification Search
CPC .............. H04L 9/00; H04L 9/08; H04L 9/14
USPC .............. 705/28–30; 370/235–256; 726/5–6
See application file for complete search history.

(56) References Cited

U.S. PATENT DOCUMENTS

| | | | | | |
|---|---|---|---|---|---|
| 8,041,335 | B2 * | 10/2011 | Khetawat | .............. | H04L 63/104 455/404.2 |
| 8,134,972 | B2 * | 3/2012 | Nakamura | ............ | H04L 63/062 370/331 |

(Continued)

FOREIGN PATENT DOCUMENTS

WO        2008070102 A2        6/2008

OTHER PUBLICATIONS

European Search Report for Application No. 17162706.0 dated Jun. 7, 2017.

*Primary Examiner* — Lynn D Feild
*Assistant Examiner* — Viral S Lakhia
(74) *Attorney, Agent, or Firm* — Womble Bond Dickinson (US) LLP

(57) ABSTRACT

A system is provided for content delivery across heterogeneous networks. The system may store a database of unified identity codes (UICs) for respective categories of information, and in-network addresses of in-network subscriber nodes subscribed to the respective categories of information. At least one in-network subscriber node may be a gateway node of and between a heterogeneous network and another heterogeneous network that includes an out-of-network subscriber node. The system may receive a query including a UIC for a category of information to which one or more in-network subscriber nodes are subscribed, and in response thereto retrieve from the database using the UIC, one or more in-network addresses for the one or more in-network subscriber nodes. The system may also reply to the query with the one or more in-network addresses for use by the source node to transmit content to the one or more in-network subscriber nodes.

18 Claims, 5 Drawing Sheets

(51) Int. Cl.
*H04W 60/00* (2009.01)
*H04W 88/16* (2009.01)
*H04L 29/12* (2006.01)

(56) References Cited

U.S. PATENT DOCUMENTS

| | | | | |
|---|---|---|---|---|
| 8,184,641 | B2* | 5/2012 | Alt | H04L 29/06027 |
| | | | | 370/352 |
| 8,316,237 | B1* | 11/2012 | Felsher | H04L 9/0825 |
| | | | | 380/282 |
| 8,949,919 | B2* | 2/2015 | Cholas | H04N 21/4147 |
| | | | | 725/112 |
| 9,247,392 | B2* | 1/2016 | Raghupathy | G01S 19/10 |
| 9,288,208 | B1* | 3/2016 | Roth | H04L 63/0884 |
| 9,609,504 | B2* | 3/2017 | Karlqvist | H04W 8/04 |
| 9,680,642 | B2* | 6/2017 | Yeh | H04L 9/12 |
| 2008/0033845 | A1* | 2/2008 | McBride | G06Q 10/087 |
| | | | | 705/28 |
| 2009/0109925 | A1* | 4/2009 | Nakamura | H04L 63/062 |
| | | | | 370/331 |
| 2011/0317836 | A1* | 12/2011 | Yeh | H04L 9/0855 |
| | | | | 380/256 |
| 2012/0030739 | A1* | 2/2012 | Vadapalli | H04L 9/0838 |
| | | | | 726/6 |
| 2014/0321444 | A1* | 10/2014 | Klein | H04W 76/045 |
| | | | | 370/338 |
| 2015/0117209 | A1* | 4/2015 | Lee | H04W 28/08 |
| | | | | 370/235 |

* cited by examiner

CONTENT DELIVERY ACROSS HETEROGENEOUS NETWORKS

TECHNOLOGICAL FIELD

The present disclosure relates generally to data networking and, in particular, to content delivery across heterogeneous networks.

BACKGROUND

Internetworking and providing reliable content delivery between heterogeneous networks is limited due to numerous challenges. In terms of data networking, for example, executive government branches typically utilize a hodge-podge of heterogeneous communication systems and networks for various military service branches. This resultantly occurs as each military service branch may have unique operational requirements and different timelines for communication system and network modernization efforts. For example, the U.S. Navy relies on long-range satellite communication links, whereas the U.S. Army utilizes shorter-range vehicle-to-vehicle communication systems and the U.S. Air Force mainly uses tactical data links such as Link 16. Generally, a specialized radio device may be embedded in a procured military vehicle such as a fighter jet or an armored vehicle, but in most cases, these communication devices either do not communicate with one another or communicate by inflexible (e.g., non-standard or non-scalable) means.

Limited solutions exist for enabling compatibility between tactical networks. In certain cases, a human-in-the-loop may be involved to relay information gathered from one network to another. However, solutions involving a human-in-the-loop may be unreliable and error-prone. In other cases, a proprietary middleware may be developed to facilitate the tasks of information translation and forwarding. For example, there is an emerging solution for providing tactical network interoperability using Internet Protocol (IP) standards. In particular, the U.S. Air Force and Navy have recently funded developmental efforts to enable their tactical network architectures to be IP compatible, and thus guarantee interoperability among them. However, existing proprietary solutions such as these may not be applicable to multiple networks as a solution designed for two specific networks may be unsuitable for implementation between another two networks.

In terms of reliable content delivery, conventional methods rely on source-to-destination address sets as unique identifiers for reliable information delivery, exchange, and retrieval. For example, when transmitting electronic mail (e-mail), a sender must enter an accurate e-mail account address of the recipient. Otherwise, errors in the recipient address may lead to delivery of the e-mail to an unintended recipient, and/or the message may be undeliverable due to the selected address name being invalid. In this example, the targeted e-mail recipient is the information destination and accurate knowledge of the respective address is critical to the success of information delivery. In another example, information content from a particular website may be accessed and retrieved by entering a corresponding IP address or Universal Resource Locator (URL) identifier within a Web browser. A website address error may lead to an inability to retrieve desired information. In this example, the targeted website is the information source and accurate knowledge of its address to critical to the success of information retrieval from this site. However, network address translation and/or compatible address resolution protocol for source-to-destination content delivery across heterogeneous networks may be limited or non-existent in many instances.

Therefore, it may be desirable to have a system and method that addresses at least some of these issues, and improves upon existing practices.

BRIEF SUMMARY

Example implementations of the present disclosure are directed to an improved system, method and computer-readable storage medium for content delivery across heterogeneous networks. The present disclosure may include a methodology for information exchange across heterogeneous networks, and more particularly, context-aware content delivery across heterogeneous networks. In particular, the system may provide several beneficial attributes such as uniformity (e.g., identical implementation among all networks involved), efficiency (in terms of required network resources), and ease of implementation. The present disclosure includes, without limitation, the following example implementations.

In some example implementations, a method is provided for content delivery across heterogeneous networks different ones of which include a source node and in-network subscriber nodes one which is a gateway node of and between the heterogeneous network and another heterogeneous network that includes an out-of-network subscriber node. The method may comprise storing a database of unified identity codes (UICs) for respective categories of information, and in association with the UICs, storing in-network addresses of the in-network subscriber nodes subscribed to the respective categories of information in which the gateway node is an in-network subscriber node to enable the out-of-network subscriber node to subscribe to at least one of the respective categories of information.

The method may also comprise receiving a query from the source node in which the query includes a UIC for a category of information to which one or more in-network subscriber nodes are subscribed. In response thereto, the method may also comprise retrieving from the database, using the UIC, one or more in-network addresses for the one or more in-network subscriber nodes. The method may also comprise replying to the query with the one or more in-network addresses for use by the source node to transmit content to the one or more in-network subscriber nodes. In at least one instance, the one or more in-network subscriber nodes include the gateway node and the one or more in-network addresses include the in-network address thereof, for the gateway node to route the content to the out-of-network subscriber node.

In some example implementations of the method of the preceding or any subsequent example implementation, or any combination thereof, storing the database includes receiving a request from a node in the heterogeneous network to subscribe to a category of information in which the request includes the UIC for the category of information, and adding an in-network address of the node to the database in association with the UIC such that the node is thereby an in-network subscriber node subscribed to the category of information.

In some example implementations of the method of any preceding or any subsequent example implementation, or any combination thereof, in at least one instance the database is updated to reflect an addition to or deletion from the one or more in-network subscriber nodes subscribed to the category of information, and the method further comprises automatically transmitting a notification to the source node that reflects the addition to or deletion from the one or more in-network subscriber nodes.

In some example implementations of the method of any preceding or any subsequent example implementation, or any combination thereof, the method further comprises storing a reference table including the UICs for the respective categories of information. The reference table is also stored for use by the source node to generate the query, or one or more of the in-network subscriber nodes or out-of-network subscriber node to request to subscribe to the category of information.

In some example implementations of the method of any preceding or any subsequent example implementation, or any combination thereof, in-network addresses are formatted according to a network protocol of the heterogeneous network, and in the at least one instance in which the one or more in-network subscriber nodes include the gateway node, the gateway network is configured to route the content to the out-of-network subscriber node using an out-of-network address formatted according to a network protocol of the other heterogeneous network.

In some example implementations of the method of any preceding or any subsequent example implementation, or any combination thereof, the method further comprises, at the gateway node, storing a plurality of keys for each of the heterogeneous networks, receiving an encrypted data packet from a source network node including the content, decrypting the data packet using a key of the plurality of keys associated with the heterogeneous network of the source network node, and generating another data packet, including the content, using a key of the plurality of keys associated with the heterogeneous network of the out-of-network subscriber node for routing the content to the out-of-network subscriber node.

In some example implementations of the method of any preceding or any subsequent example implementation, or any combination thereof, the heterogeneous networks include at least one Internet Protocol (IP) network and non-IP network.

In some example implementations, an apparatus is provided for content delivery across heterogeneous networks. The apparatus comprises a processor and a memory storing executable network node instructions that, in response to execution by the processor, cause the apparatus to implement a number of subsystems, such as a network node, gateway network node, and database which may be configured to at least perform the method of any preceding example implementation, or any combination thereof.

In some example implementations, a computer-readable storage medium is provided for content delivery across heterogeneous networks. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
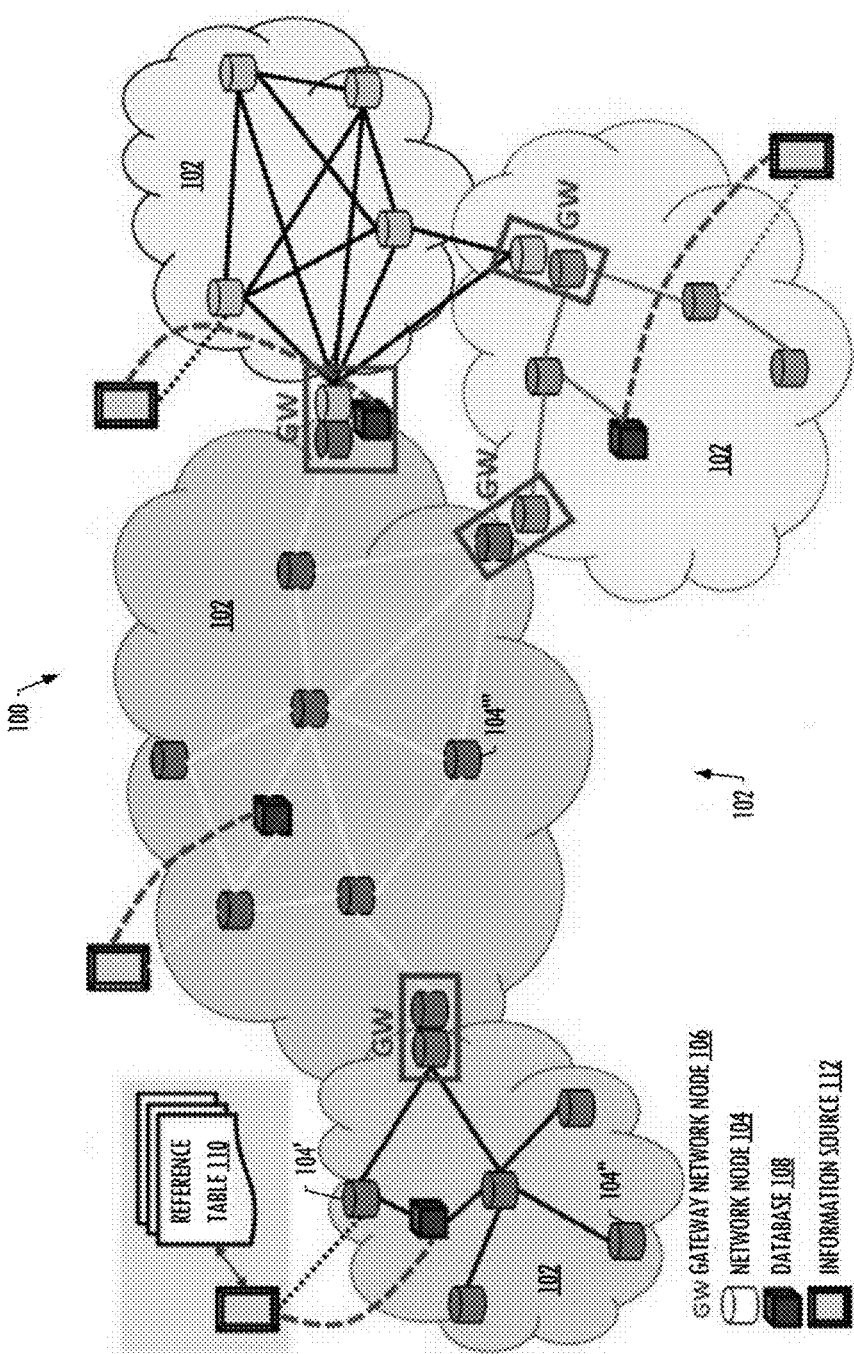
FIG. 1 is an illustration of a system for content delivery across heterogeneous networks, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable network node variations that may occur, such as those due to engineering tolerances or the like. Like reference numerals refer to like elements throughout.

Example implementations of the present disclosure are generally directed to data networking and, in particular, to content delivery across heterogeneous networks. As used herein, heterogeneous networks refer to networks that use different protocols, access technologies or the like. In particular, a heterogeneous network may refer to a combined inter-connected network consisting of a plurality of individual networks therein in which each individual network may have protocols and implementations that may differ from another individual network. Example implementations will be primarily described in conjunction with tactical networks, data networking and content delivery applications. It should be understood, however, that example embodiments may be utilized in conjunction with a variety of other applications such as content delivery within a single homogeneous network.

FIG. 1 illustrates a system 100 for content delivery across heterogeneous networks according to example implementations of the present disclosure, which may be simply referred to as the "system" herein. The system may be configured to perform a number of different functions or operations, either automatically, under direct operator control, or some combination of thereof. In this regard, the system may be configured to perform one or more of its functions or operations automatically, that is, without being directly controlled by an operator. Additionally or alternatively, the system may be configured to perform one or more of its functions or operations under direct operator control.

The system 100 may enable data networking and content delivery across a plurality of heterogeneous networks based at least in part on content subscriptions. The system may facilitate information exchange amongst network devices in which an end host receives desired information based on self-subscribed membership to specific information content as categorized by a unified information code (UIC). The system may thereby reduce the effort of matching information sources to rightful recipients. In particular, the system may eliminate and/or significantly reduce a need for discovery, tracking, and/or maintenance of locations or addresses of information sources and destinations.

The system 100 may provide improvements to existing information exchange systems and methods independent of the underlying network protocol that may be different for different ones of the networks, and thus may be beneficial in terms of reliability, efficiency and ease of operation for unified data networking. In some examples, the system may be executed as a middleware application in network devices (e.g., routers and data servers) and/or end-user devices.

The system 100 may include one or more of each of a number of different subsystems (each an individual system) coupled to one another for performing one or more functions or operations. As shown in FIG. 1, for example, the system may include a plurality of heterogeneous networks 102 that may each use different protocols, access technologies or the like for facilitating communication within the respective network. Examples of suitable network protocols may include Wireless Fidelity (WiFi), Bluetooth, Fiber Channels, Internet protocol suite (TCP/IP) including Transmission Control Protocol (TCP), Internet Protocol (IP) and User Datagram Protocol (UDP), Open Systems Interconnection (OSI), routing protocols, Real-Time Publish Subscribe (RTPS), Secure Shell (SSH), Server Message Block (SMB), File Transfer Protocol (FTP), Simple Mail Transfer Protocol (SMTP), Telnet, Hypertext Transfer Protocol (HTTP), Post Office Protocol (POP), Media Transfer Protocol (MTP), Secure File Transfer Protocol (SFTP), Transport Layer Security (TLS), Network Protocol Stack E6, Network Time Protocol (NTP), Point-to-Point Protocol (PPP), Network News Transfer Protocol (NNTP), Internet Message Access Protocol (IMAP), or a combination thereof.

Each heterogeneous network 102 may include a number of network nodes 104 configured to communicate within the heterogeneous network. In some examples, network nodes from multiple of the heterogeneous networks may be integrated to form a gateway network node 106 configured to communicate within and across the respective heterogeneous networks. A gateway network node may therefore be considered a part of any or each of the respective heterogeneous networks.

The system 100 may also include a number of databases 108 and a reference table 110 for unifying communication across the various heterogeneous networks 102. As shown, for example, each of the heterogeneous networks may include a respective database, and in some instances the database may be integrated within a network node (e.g., a gateway network node 106). The reference table may be locally stored within and/or accessible by each network node 104, database 106 or an information source 112 configured to provide content for delivery by a respective network node. In some examples, the information source may be within a heterogeneous network. In other examples, the information source may be external from, but accessible to, a network node or database within the heterogeneous network.

Although shown as part of the system 100, one or more of the heterogeneous networks 102, network nodes 104, databases 108, reference tables 110 or information sources 112 may instead be separate from but in communication with the system. It should also be understood that one or more of the subsystems may function or operate as a separate system without regard to others of the subsystems. And further, it should be understood that the system may include one or more additional or alternative subsystems than those shown in FIG. 1.

In accordance with example implementations of the present disclosure, data networking and content delivery between network nodes 104 within and across the plurality of heterogeneous networks 102 may be based on system-wide utilization of a plurality of unified identity codes (UICs) for a respective plurality of categories of information that may be exchanged between the network nodes. In some examples, the relationship between the UICs and the categories of information may be captured within the reference table 110, and the UICs may be used by the network nodes to exchange content for the categories of information. For example, data packets with content for a category of information exchanged between network nodes may include a tag with the UIC for that category of information. These data packets may then be identified by the network nodes based at least in part on the UIC in the tag.

A network node 104 may be configured to function as a source network node to transmit data, such as data including content provided by an information source 112. Additionally or alternatively, a network node may be configured to function as a subscriber network node subscribe configured to receive content for particular ones of the categories of information. In these examples, the database 108 may be configured to store the UICs for the respective categories of information, and in association with the UICs, further store in-network addresses of network subscriber nodes for the respective categories of information.

In some examples, a subscriber network node may function as an in-network subscriber network node and/or an out-of-network subscriber network node based on a relationship of the network subscriber to any given heterogeneous network 102 from which subscribed content may be provided. FIG. 1 illustrates one example of a source network node 104', an in-network subscriber network node 104'', and an out-of-network subscriber network node 104'''. As shown in the illustrated example, the source network node and in-network subscriber node are within the same heterogeneous network, and the out-of-network subscriber node is external to the heterogeneous network, but it should be understood that any given network node may be configured to function as one or more of a source network node, in-network subscriber node, or out-of-network subscriber node.

According to example implementations of the present disclosure, the system 100 and its subsystems and/or components including the heterogeneous networks 102, network nodes 104 (including source network nodes 104', in-network subscriber nodes 104", out-of-network subscriber nodes 104''', and gateway network nodes 106), databases 108, reference tables 110, and/or information sources 112 and the subcomponents thereof may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement a network node 104, gateway network node 106, database 108 or the like shown and described herein. In examples involving more than one apparatus, the respective apparatuses may be connected to or otherwise in communication with one another in a number of different manners, such as directly or indirectly via a wired or wireless network or the like.

Figure 2:
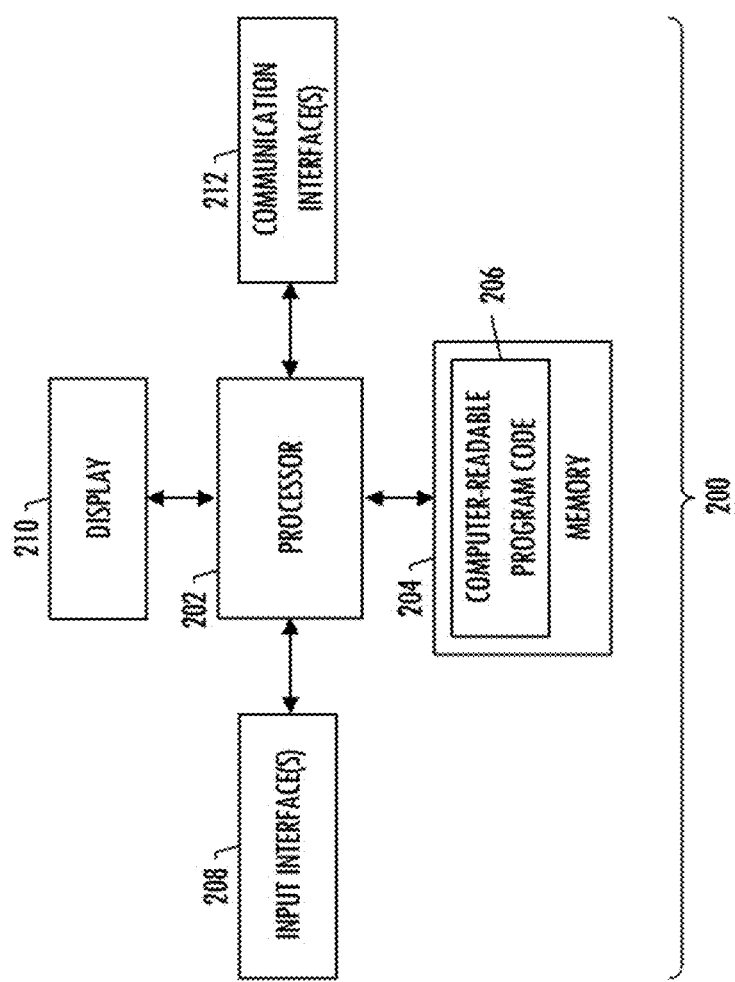
FIG. 2 illustrates an apparatus according to example implementations of the present disclosure.

FIG. 2 illustrates an apparatus 200 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. In other examples, suitable electronic device include a number of networking devices such as routers, gateways, switches, bridges, hubs, repeaters, and/or a combination thereof. The apparatus may include one or more of each of a number of components such as, for example, a processor 202 (e.g., processor unit) connected to a memory 204 (e.g., storage device).

The processor 202 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 204 (of the same or another apparatus).

The memory 204 is generally any piece of computer hardware that is capable of storing information such as, for example, data, computer programs such as computer-readable program code 206, and/or other suitable information either on a temporary basis and/or a permanent basis. In addition to the memory, the processor 202 may also be connected to one or more interfaces for displaying, transmitting and/or receiving information. The interfaces may include one or more input interfaces 208 (e.g., user input interfaces), a display 210, and/or communications interface 212 (e.g., communications unit).

Figure 3:
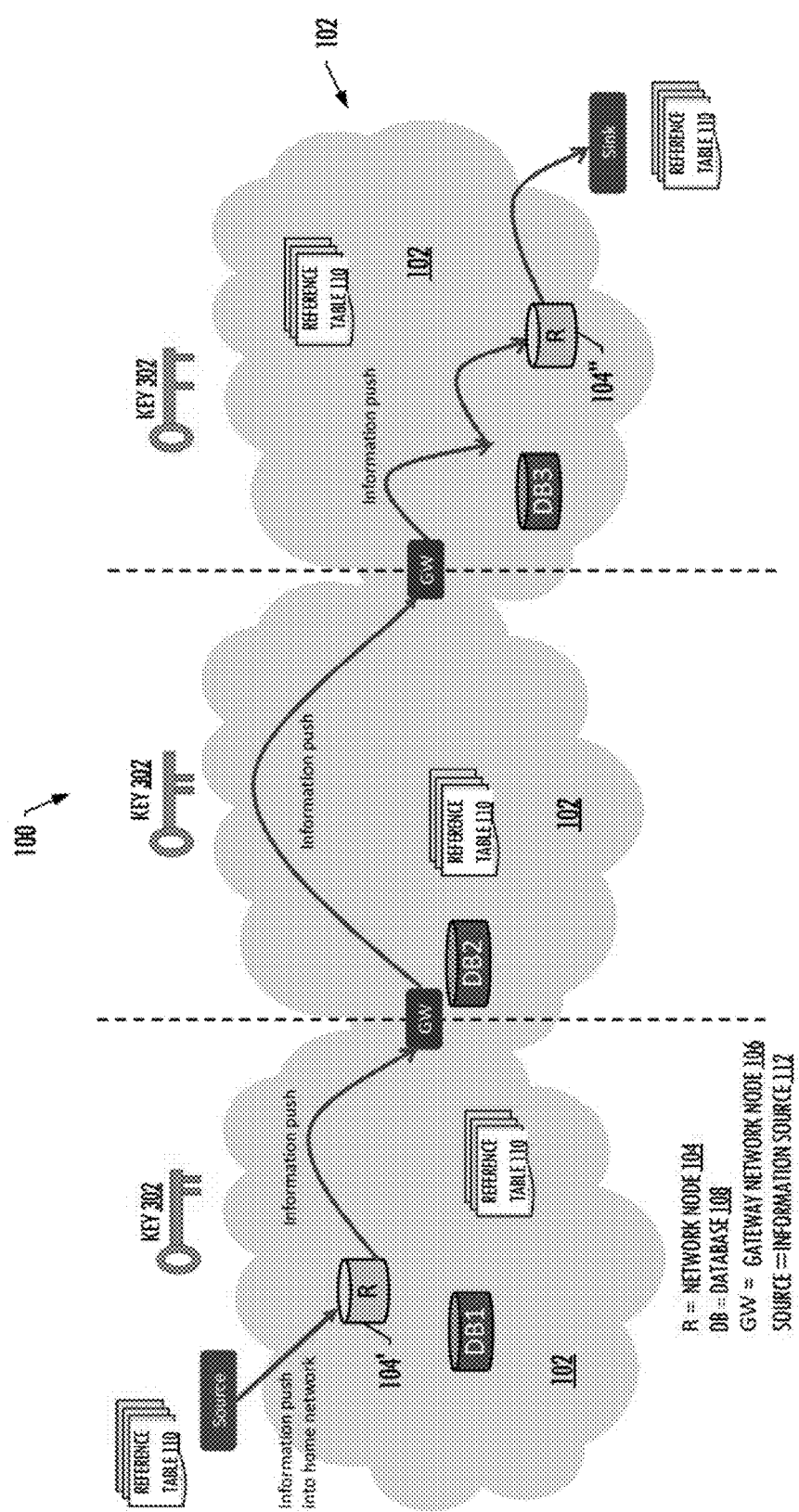
FIG. 3 is a more particular illustration of the system of FIG. 1, according to example implementations of the present disclosure.

FIG. 3 illustrates a more particular example of the system 100 for content delivery across heterogeneous networks according to example implementations of the present disclosure. As shown, the database 108 may be generally configured to store unified identity codes (UICs) for respective categories of information. In association with the UICs, the database may also store in-network addresses of the in-network subscriber nodes 104" subscribed to the respective categories of information. In particular, the database 106 may receive a query from a source network node 104' including a UIC for a category of information to which one or more in-network subscriber nodes 104" are subscribed. In response thereto, the database may retrieve, using the UIC, in-network addresses for the one or more in-network subscriber nodes, and reply to the query with the in-network addresses for use by the source network node to transmit content to the in-network subscriber nodes.

In some examples, a gateway node 106 may be an in-network subscriber node 104" configured to enable an out-of-network subscriber node 104''' to subscribe to at least one of the respective categories of information. Thus in at least one instance, the in-network subscriber nodes may include the gateway node, and the in-network addresses may include the in-network address thereof, for the gateway node to route the content to the out-of-network subscriber node. In these examples, the in-network addresses of the in-network subscriber nodes may be formatted according to a network protocol of the respective heterogeneous network 102, and the gateway network may be configured to route the content to the out-of-network subscriber node using an out-of-network address formatted according to a network protocol of the other heterogeneous network.

For instance, in some examples, the plurality of heterogeneous networks 102 may have incompatible network level encryption. In these examples, the gateway network node 106 may be configured to receive an encrypted data packet from the source network node 104' in which the data packet includes subscribed content. The gateway network node may decrypt the data packet using a key 302 associated with the respective heterogeneous network of the source network node. The gateway network node may then generate another data packet including the subscribed content of the data packet, and encrypt the another data packet using a key associated with the respective heterogeneous network of the out-of-network subscriber node 104''' for routing the subscribed content to the out-of-network subscriber node. As such, the gateway network node may store a plurality of encryption and/or decryption keys for each respective network (if required) for enabling content delivery between the various heterogeneous networks.

As previously indicated, the database 108 may be implemented as a means for resolving destinations of content specific information by storing UICs for respective categories of information, and in associated therewith, storing addresses of in-network subscriber nodes 104" subscribed to the respective categories of information. The database may match recipients to each UIC, and may be periodically populated, maintained and updated. In at least one instance the database may be updated to reflect an addition to or deletion from the in-network subscribers subscribed to the category of information. In these instances, the database may automatically transmit a notification to the source node 104' that reflects the addition to or deletion from the one or more in-network subscriber nodes.

As also previously indicated, the plurality of heterogeneous networks 102 may function according to various network protocols. In some examples, the heterogeneous networks include at least one Internet Protocol (IP) network and non-IP network such as a Link 16 tactical data link (TDL) network in the instance of military applications, or a wireless cellular network in the instance of commercial applications. Thus, it should be noted that example implementations of the claims invention may be used in conjunction with various other non-IP networks not explicitly contemplated herein. In these example implementations, the network nodes 104 may be configured to transmit and/or receive subscribed data based at least in part on a data packet being assigned a tag including a UIC. For example, a source network node 104' may assign a data packet a tag including a UIC, and a receiving network node (e.g., in-network subscriber node 104", out-of-network subscriber node 104''' or gateway network node 106) may then be configured to receive and identify the data packet including the subscribed content based at least in part on the tag.

In some examples, the tag may further include at least one secondary UIC associated with a subcategory of the category of information in which the at least one secondary UIC may also be from the plurality of UICs. For example, the category of information may include weather information for a specific city. The weather information may be assigned a UIC such that interested recipients may actively subscribe to the weather information, or more particularly the UIC. In this example, "weather information" may be designated as a primary category of information, and the weather information for a specific city may be further designated using secondary categories of the primary category (e.g., city, data source, update frequency, and the like). In some examples, the UIC may be encoded into a suitable binary format in which each category or secondary category includes a corresponding numerical value. For example, a UIC for the categories of weather, city, data source, and update frequency may be or include "120.3001.5.6" in which "120" is the identification (ID) number for weather message, "3001" is the ID of a particular city, "5" is the ID of the data source and "6" refers to the ID of the frequency update indicator.

An information source 112 of the content specific information (e.g., satellite weather forecaster, local meteorologist and/or historical weather database in the instance of a weather information category) may access the database 108 via a source network node 104' for determining rightful recipient addresses for the content. Accordingly, the database may store the reference table 110 including the UICs for the respective categories of information. The reference table may also be stored for use by the network nodes 104 for transmitting information, generating queries, or requesting to subscribe to the category of information.

Figure 4:
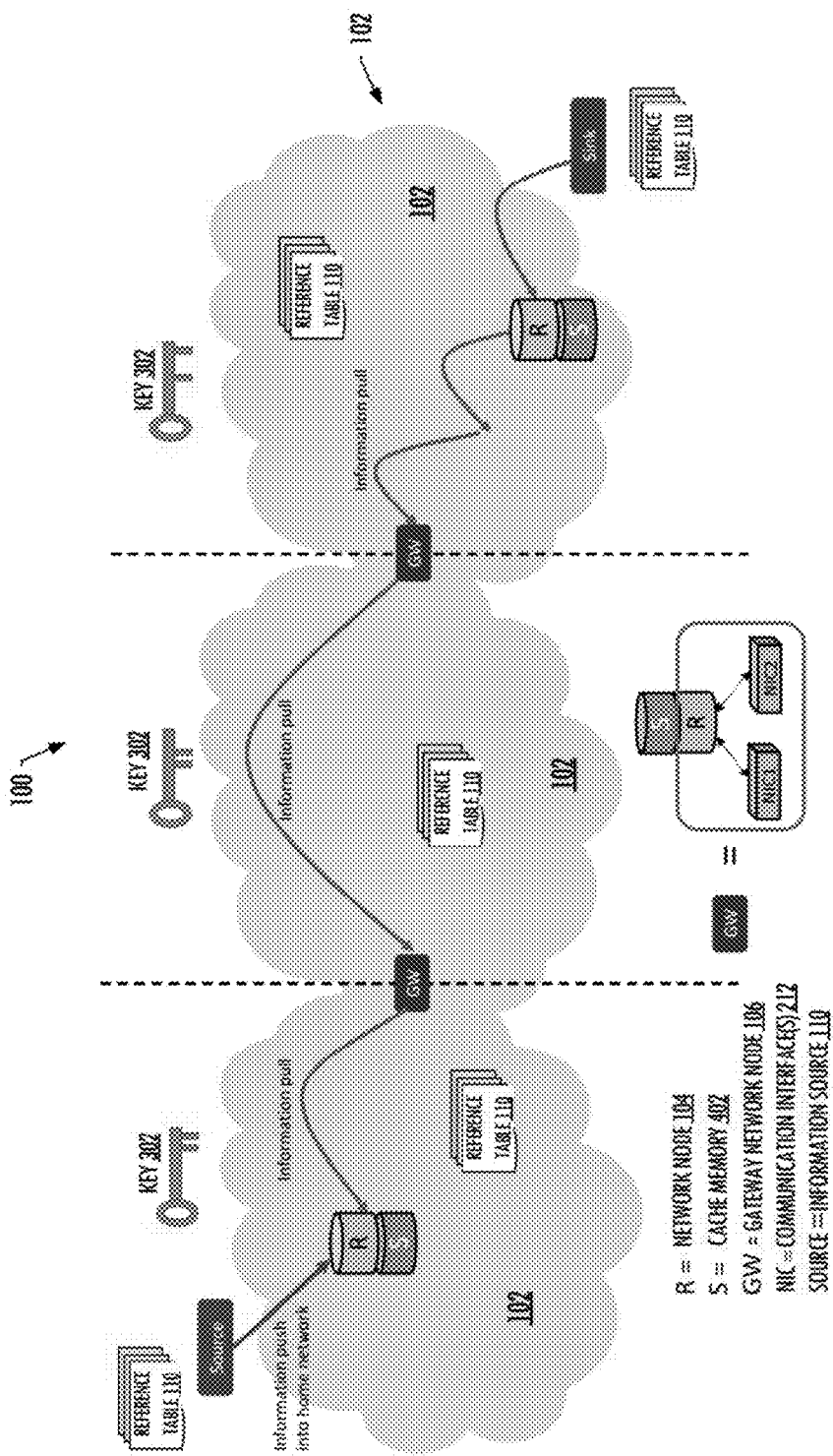
FIG. 4 is a more particular illustration of the system of FIG. 1, according to example implementations of the present disclosure.

FIG. 4 illustrates a more particular example of the system 100 for data networking across heterogeneous networks according to example implementations of the present disclosure. As previously indicated, a network node 104 may be configured to function as either or both a source network node or a querying network node function as one or more of a source network node 104', in-network subscriber node 104", or out-of-network subscriber node 104''' for enabling information push across a plurality of heterogeneous networks 102. In some alternative examples, the network node may function as a querying network node (in addition to or in lieu of a source network node or subscriber network node) configured to request and receive data, such as from a source network node, and thereby enabling information pull across the heterogeneous networks.

In these examples, the querying network node may be configured to generate and transmit a query including a UIC to another network node, and in response thereto, receive a reply data packet having a payload with content for the category of information and a tag that includes the UIC. Further in these examples, the memory 204 of the network node 104, or in particular examples the gateway network node 106, may include and/or be coupled to a cache memory 402 such that the gateway network node may also function as a secondary source of subscribed content.

Thus in some examples, the gateway network node 106 may be configured to receive content from a source node 104', store the content in cache memory 402, and route the content to an out-of-network subscriber node 104'''. In at least one instance thereafter, the gateway network node may be configured to receive a query including the UIC from another out-of-network subscriber node, and in response thereto retrieve the content from the cache memory and reply to the query with the content. More information regarding these aspects may be found in U.S. patent application Ser. No. 15/083,009, entitled: Unified Data Networking Across Heterogeneous Networks, filed concurrently herewith, the content of which is incorporated herein by reference in its entirety.

Figure 5:
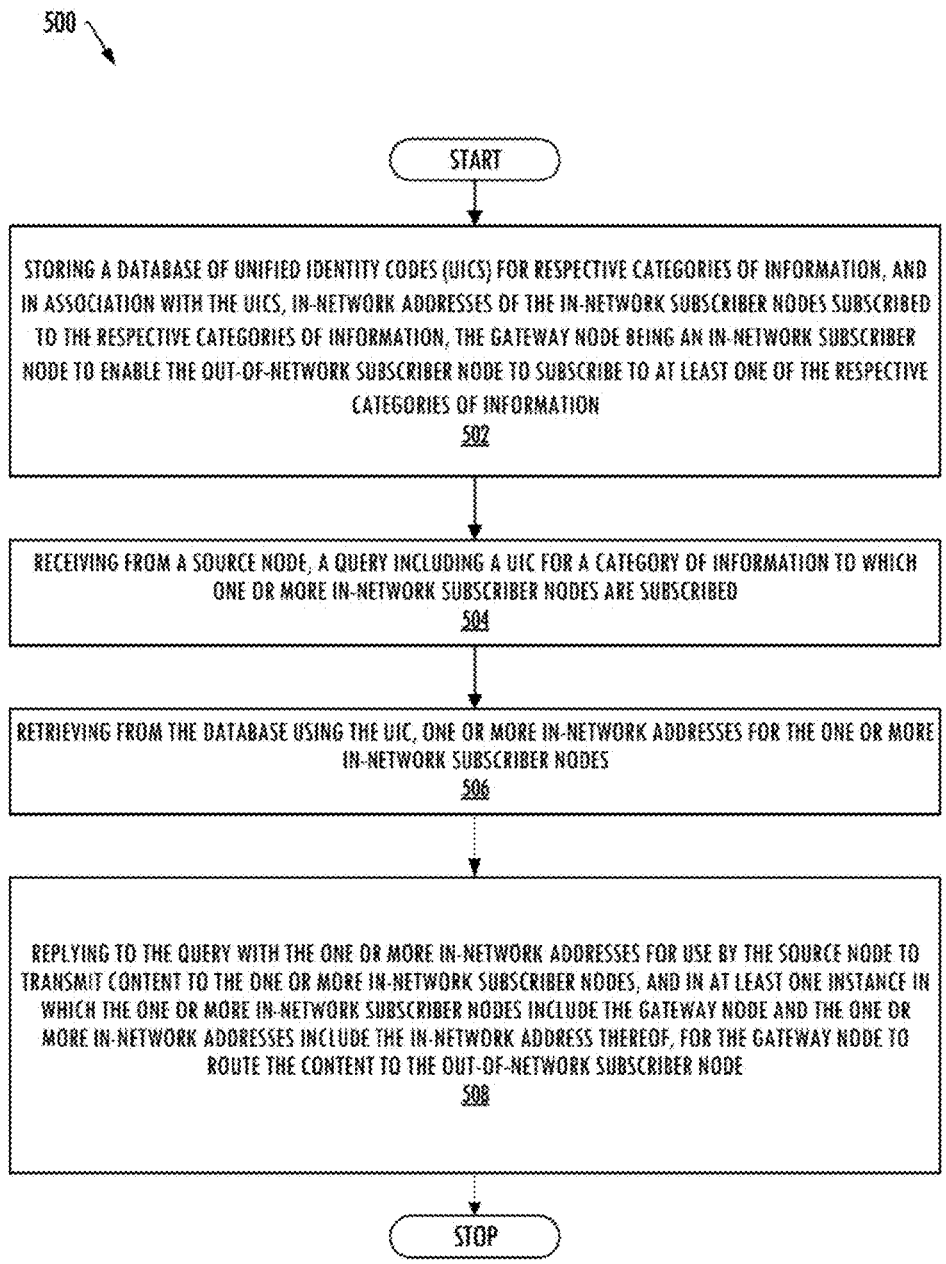
FIG. 5 is a flow diagram illustrating various operations of a method for content delivery across heterogeneous networks, according to example implementations of the present disclosure.

FIG. 5 illustrates a flowchart including various operations of a method 500 for content delivery across a plurality of heterogeneous networks different ones of which include a source node and in-network subscriber nodes one which is a gateway node of and between the heterogeneous network and another heterogeneous network that includes an out-of-network subscriber node, in accordance with an example implementation of the present disclosure. As shown at block 502, the method may include storing a database of unified identity codes (UICs) for respective categories of information, and in association with the UICs, in-network addresses of the in-network subscriber nodes subscribed to the respective categories of information. The gateway node may be an in-network subscriber node to enable the out-of-network subscriber node to subscribe to at least one of the respective categories of information.

The method 500 may also include receiving from the source node, a query including a UIC for a category of information to which one or more in-network subscriber nodes are subscribed, and in response thereto, retrieving from the database using the UIC, one or more in-network addresses for the one or more in-network subscriber nodes, as respectively shown at blocks 504 and 506. The method may also include replying to the query with the one or more in-network addresses for use by the source node to transmit content to the one or more in-network subscriber nodes. In at least one instance, the one or more in-network subscriber nodes include the gateway node and the one or more in-network addresses include the in-network address thereof, for the gateway node to route the content to the out-of-network subscriber node, as shown in block 510.

Referring again to FIG. 2, the processor 202 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 204 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

The input interfaces 208 may be wired or wireless, and may be configured to receive information from a user into the apparatus, such as for processing, storage and/or display. Suitable examples of input interfaces include a microphone, image or video capture device, keyboard or keypad, joystick, touch-sensitive surface (separate from or integrated into a touchscreen), biometric sensor or the like. The input interfaces may further include one or more interfaces for communicating with peripherals such as printers, scanners or the like.

The display 210 may be configured to present or otherwise display information to a user, suitable examples of which include a liquid crystal display (LCD), light-emitting diode (LED) display, plasma display panel (PDP) or the like. The communications interface 212 may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 200 may include a processor 202 and a computer-readable storage medium or memory 204 coupled to the processor, where the processor is configured to execute computer-readable program code 206 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for content delivery across a plurality of heterogeneous networks different ones of which include a source node and in-network subscriber nodes one of which is a gateway node of and between the heterogeneous network and another heterogeneous network that includes an out-of-network subscriber node, the apparatus comprising:
a plurality of communication interfaces communicably coupleable to respectively the plurality of heterogeneous networks; and
a processor and a memory storing executable network node instructions that, in response to execution by the processor, cause the apparatus to at least:
store a database of unified identity codes (UICs) that categorize information as respective categories of information, and in association with the UICs, in-network addresses of the in-network subscriber nodes subscribed to the respective categories of information, the gateway node being an in-network subscriber node of the in-network subscriber nodes subscribed to at least one of the respective categories of information to enable the out-of-network subscriber node to subscribe to the at least one of the respective categories of information;
receive from the source node, a query including a UIC for a category of information to which one or more in-network subscriber nodes are subscribed;
and in response thereto, retrieve from the database using the UIC, one or more in-network addresses for the one or more in-network subscriber nodes, the database being integrated with the gateway node; and reply to the query with the one or more in-network addresses for use by the source node to transmit content to the one or more in-network subscriber nodes, and in at least one instance in which the one or more in-network subscriber nodes include the gateway node and the one or more in-network addresses include the in-network address thereof, for the gateway node to route the content to the out-of-network subscriber node, wherein the apparatus includes the gateway node, and the memory stores further executable instructions that, in response to execution by the processor, cause the apparatus to further at least:

store a plurality of keys for each of the heterogeneous networks for enabling content delivery between the heterogeneous networks;

receive an encrypted data packet from a source network node, the encrypted data packed including the content;

decrypt the data packet using a key of the plurality of keys associated with the heterogeneous network of the source network node; and generate another data packet, including the content, using a key of the plurality of keys associated with the heterogeneous network of the out-of-network subscriber node for routing the content to the out-of-network subscriber node.

2. The apparatus of claim 1, wherein the apparatus being caused to store the database includes being caused to:

receive a request from a node in the heterogeneous network to subscribe to a category of information, the request including the UIC for the category of information; and add an in-network address of the node to the database in association with the UIC, the node thereby being an in-network subscriber node subscribed to the category of information.

3. The apparatus of claim 1, wherein in at least one instance the database is updated to reflect an addition to or deletion from the one or more in-network subscriber nodes subscribed to the category of information, and the processor and the memory store further executable instructions that, in response to execution by the processor, cause the apparatus to further at least:

automatically transmit a notification to the source node that reflects the addition to or deletion from the one or more in-network subscriber nodes.

4. The apparatus of claim 1, wherein the memory stores further executable instructions that, in response to execution by the processor, cause the apparatus to further at least:

store a reference table including the UICs for the respective categories of information, the reference table also stored for use by the source node to generate the query, or one or more of the in-network subscriber nodes or out-of-network subscriber node to request to subscribe to the category of information.

5. The apparatus of claim 1, wherein in-network addresses are formatted according to a network protocol of the heterogeneous network, and in the at least one instance in which the one or more in-network subscriber nodes include the gateway node, the gateway network is configured to route the content to the out-of-network subscriber node using an out-of-network address formatted according to a network protocol of the other heterogeneous network.

6. The apparatus of claim 1, wherein the heterogeneous networks include at least one Internet Protocol (IP) network and non-IP network.

7. A method for content delivery across a plurality of heterogeneous networks different ones of which include a source node and in-network subscriber nodes one of which is a gateway node of and between the heterogeneous network and another heterogeneous network that includes an out-of-network subscriber node, the method comprising:

storing a database of unified identity codes (UICs) for that categorize information as respective categories of information, and in association with the UICs, in-network addresses of the in-network subscriber nodes subscribed to the respective categories of information, the gateway node being an in-network subscriber node of the in-network subscriber nodes subscribed to at least one of the respective categories of information to enable the out-of-network subscriber node to subscribe to the at least one of the respective categories of information; receiving from the source node, a query including a UIC for a category of information to which one or more in-network subscriber nodes are subscribed; and in response thereto, retrieving from the database using the UIC, one or more in-network addresses for the one or more in-network subscriber nodes, the database being integrated with the gateway node; and replying to the query with the one or more in-network addresses for use by the source node to transmit content to the one or more in-network subscriber nodes, and in at least one instance in which the one or more in-network subscriber nodes include the gateway node and the one or more in-network addresses include the in-network address thereof, for the gateway node to route the content to the out-of-network subscriber node, wherein the gateway node, and the memory stores further executable instructions to further at least:

store a plurality of keys for each of the heterogeneous networks for enabling content delivery between the heterogeneous networks;

receive an encrypted data packet from a source network node, the encrypted data packed including the content;

decrypt the data packet using a key of the plurality of keys associated with the heterogeneous network of the source network node; and generate another data packet, including the content, using a key of the plurality of keys associated with the heterogeneous network of the out-of-network subscriber node for routing the content to the out-of-network subscriber node.

8. The method of claim 7, wherein storing the database includes:

receiving a request from a node in the heterogeneous network to subscribe to a category of information, the request including the UIC for the category of information; and adding an in-network address of the node to the database in association with the UIC, the node thereby being an in-network subscriber node subscribed to the category of information.

9. The method of claim 7, wherein in at least one instance the database is updated to reflect an addition to or deletion from the one or more in-network subscriber nodes subscribed to the category of information, and the method further comprises:

automatically transmitting a notification to the source node that reflects the addition to or deletion from the one or more in-network subscriber nodes.

10. The method of claim 7, further comprising storing a reference table including the UICs for the respective categories of information, the reference table also stored for use by the source node to generate the query, or one or more of the in-network subscriber nodes or out-of-network subscriber node to request to subscribe to the category of information.

11. The method of claim 7 wherein in-network addresses are formatted according to a network protocol of the heterogeneous network, and in the at least one instance in which the one or more in-network subscriber nodes include the gateway node, the gateway network is configured to route the content to the out-of-network subscriber node using an out-of-network address formatted according to a network protocol of the other heterogeneous network.

12. The method of claim 7, wherein the heterogeneous networks include at least one Internet Protocol (IP) network and non-IP network.

13. A computer-readable storage medium for content delivery across a plurality of heterogeneous networks different ones of which include a source node and in-network subscriber nodes one of which is a gateway node of and between the heterogeneous network and another heterogeneous network that includes an out-of-network subscriber node, the computer-readable storage medium being non-transitory and having computer-readable program code portions stored therein that in response to execution by a processor, cause an apparatus to at least: store a database of unified identity codes (UICs) for that categorize information as respective categories of information, and in association with the UICs, in-network addresses of the in-network subscriber nodes subscribed to the respective categories of information, the gateway node being an in-network subscriber node of the in-network subscriber nodes subscribed to at least one of the respective categories of information to enable the out-of-network subscriber node to subscribe to the at least one of the respective categories of information; receive from the source node, a query including a UIC for a category of information to which one or more in-network subscriber nodes are subscribed; and in response thereto, retrieve from the database using the UIC, one or more in-network addresses for the one or more in-network subscriber nodes, the database being integrated with the gateway node; and reply to the query with the one or more in-network addresses for use by the source node to transmit content to the one or more in-network subscriber nodes, and in at least one instance in which the one or more in-network subscriber nodes include the gateway node and the one or more in-network addresses include the in-network address thereof, for the gateway node to route the content to the out-of-network subscriber node,
  wherein the the gateway node, and the memory stores further executable instructions to further at least:
  store a plurality of keys for each of the heterogeneous networks for enabling content delivery between the heterogeneous networks;
  receive an encrypted data packet from a source network node, the encrypted data packed including the content;
  decrypt the data packet using a key of the plurality of keys associated with the heterogeneous network of the source network node; and
  generate another data packet, including the content, using a key of the plurality of keys associated with the heterogeneous network of the out-of-network subscriber node for routing the content to the out-of-network subscriber node.

14. The computer-readable storage medium of claim 13, wherein the apparatus being caused to store the database includes being caused to:
  receive a request from a node in the heterogeneous network to subscribe to a category of information, the request including the UIC for the category of information; and
  add an in-network address of the node to the database in association with the UIC, the node thereby being an in-network subscriber node subscribed to the category of information.

15. The computer-readable storage medium of claim 13 wherein in at least one instance the database is updated to reflect an addition to or deletion from the one or more in-network subscriber nodes subscribed to the category of information, and the computer-readable storage medium has further computer-readable program code portions stored therein that in response to execution by the processor, cause the apparatus to at least:
  automatically transmit a notification to the source node that reflects the addition to or deletion from the one or more in-network subscriber nodes.

16. The computer-readable storage medium of claim 13, having further computer-readable program code portions stored therein that in response to execution by the processor, cause the apparatus to at least:
  store a reference table including the UICs for the respective categories of information, the reference table also stored for use by the source node to generate the query, or one or more of the in-network subscriber nodes or out-of-network subscriber node to request to subscribe to the category of information.

17. The computer-readable storage medium of claim 13, wherein in-network addresses are formatted according to a network protocol of the heterogeneous network, and in the at least one instance in which the one or more in-network subscriber nodes include the gateway node, the gateway network is configured to route the content to the out-of-network subscriber node using an out-of-network address formatted according to a network protocol of the other heterogeneous network.

18. The computer-readable storage medium of claim 13, wherein the heterogeneous networks include at least one Internet Protocol (IP) network and non-IP network.

* * * * *